(12) United States Patent
McMahon, III

(10) Patent No.: US 11,071,287 B2
(45) Date of Patent: *Jul. 27, 2021

(54) BEEKEEPING SYSTEMS, APPARATUS, AND METHODS

(71) Applicant: Cedar Creek Apiary, LLC, Charlotte, NC (US)

(72) Inventor: Vallie Hayden McMahon, III, Charlotte, NC (US)

(*) Notice: Subject to any disclaimer, the term of this patent is extended or adjusted under 35 U.S.C. 154(b) by 153 days.

This patent is subject to a terminal disclaimer.

(21) Appl. No.: 15/494,760

(22) Filed: Apr. 24, 2017

(65) Prior Publication Data

US 2018/0007872 A1    Jan. 11, 2018

Related U.S. Application Data

(63) Continuation of application No. 14/589,092, filed on Jan. 5, 2015, now Pat. No. 9,629,342, which is a continuation of application No. 14/313,869, filed on Jun. 24, 2014, now Pat. No. 8,926,397, which is a continuation of application No. PCT/US2013/052995, filed on Jul. 31, 2013.

(60) Provisional application No. 61/677,914, filed on Jul. 31, 2012.

(51) Int. Cl.
*A01K 59/00* (2006.01)
*A01K 59/04* (2006.01)
*A01K 47/02* (2006.01)

(52) U.S. Cl.
CPC .............. *A01K 59/00* (2013.01); *A01K 47/02* (2013.01); *A01K 59/04* (2013.01); *Y10T 29/49826* (2015.01)

(58) Field of Classification Search
CPC ......... A01K 47/02; A01K 59/00; A01K 59/02
See application file for complete search history.

(56) References Cited

U.S. PATENT DOCUMENTS

| | | | | |
|---|---|---|---|---|
| 1,518,077 A | * | 12/1924 | Kouba | A01K 55/00 449/50 |
| 1,754,802 A | * | 4/1930 | Raster | B65F 1/163 119/DIG. 1 |
| 2,698,450 A | * | 1/1955 | Mack | B44D 3/12 134/92 |
| 3,758,896 A | * | 9/1973 | Croan | A01K 59/04 449/43 |
| 4,203,537 A | * | 5/1980 | McAlister | B44D 3/128 220/675 |
| 4,782,970 A | * | 11/1988 | Edwards | B03C 1/26 209/215 |

(Continued)

*Primary Examiner* — Michael H Wang
(74) *Attorney, Agent, or Firm* — Tillman Wright, PLLC; Jeremy C. Doerre; Chad D. Tillman

(57) ABSTRACT

A beekeeping apparatus includes a bottom side having an arcuate groove defined therein, the arcuate groove being sized and dimensioned to correspond to the rim of a repository; and a top side including a recessed area defined therein, the recessed area being sized and dimensioned to correspond to a beekeeping frame, and a plurality of generally rectangular openings defined through the recessed area, the rectangular openings each being sized and dimensioned to receive and retain a portion of a beekeeping frame, and collectively being sized and dimensioned to receive and retain portions of different sizes of beekeeping frames.

6 Claims, 11 Drawing Sheets

(56) References Cited

U.S. PATENT DOCUMENTS

| | | | | |
|---|---|---|---|---|
| 5,797,497 A | * | 8/1998 | Edwards | B07C 5/344 |
| | | | | 209/570 |
| D410,576 S | * | 6/1999 | Edwards | D34/10 |
| 6,129,213 A | * | 10/2000 | Edwards | B03C 1/28 |
| | | | | 209/214 |
| D474,318 S | * | 5/2003 | Van Landingham, Jr. | D34/10 |

* cited by examiner

BEEKEEPING SYSTEMS, APPARATUS, AND METHODS

CROSS REFERENCE TO RELATED APPLICATIONS

The present application is a U.S. continuation patent application of, and claims priority under 35 U.S.C. § 120 to, U.S. patent application Ser. No. 14/589,092, filed Jan. 5, 2015, which '092 patent application published as U.S. patent application publication no. 2015/0133026 and issued as U.S. Pat. No. 9,629,342 on Apr. 25, 2017, which patent application, patent application publication, and patent are hereby incorporated herein by reference, and which '092 patent application is a U.S. continuation patent application of, and claims priority under 35 U.S.C. § 120 to, U.S. patent application Ser. No. 14/313,869, filed Jun. 24, 2014, which '869 patent application published as U.S. patent application publication no. 2014/0308876 and issued as U.S. Pat. No. 8,926,397 on Jan. 6, 2015, which patent application, patent application publication, and patent are hereby incorporated herein by reference, and which '869 patent application is a U.S. continuation patent application of, and claims priority under 35 U.S.C. § 120 to, international patent application serial number PCT/US2013/052995, filed Jul. 31, 2013, which international patent application and any patent application publications thereof, including international patent application publication WO2014/022545 are hereby incorporated herein by reference, and which international patent application is, for purposes of the U.S., a U.S. nonprovisional patent application of, and claims priority under 35 U.S.C. § 119(e) to, U.S. provisional patent application Ser. No. 61/677,914, filed Jul. 31, 2012. This provisional patent application is also hereby incorporated herein by reference.

COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to an apparatus for use in beekeeping.

Recently, beekeeping has grown increasingly popular, both as a hobby and as a source of supplemental income. A conventional methodology for beekeeping involves the use of frames, wooden, plastic, or otherwise, into which bees build honeycomb. FIG. 1 illustrates an exemplary such conventional frame. These frames can be of various depths, as illustrated in FIG. 2. In each of these figures, in illustrating these frames, a removable screen into which bees can build honeycomb has been omitted for clarity. Honey from this honeycomb can subsequently be harvested, by removing such a frame into which bees have built honeycomb, uncapping the honeycomb, such as with an uncapping fork or uncapping knife, and letting the honey flow out of the uncapped honeycomb into a repository, such as, for example, a five gallon bucket. FIG. 3 illustrates an exemplary such five gallon bucket which could be used to capture honey following uncapping of honeycomb built into a frame.

However, one or more needs exist for improvement in such a beekeeping methodology. This, and other needs, are addressed by one or more aspects of the present invention.

SUMMARY OF THE INVENTION

The present invention includes many aspects and features. Moreover, while many aspects and features relate to, and are described in, the context of beekeeping, the present invention is not limited to use only in this context, as will become apparent from the following summaries and detailed descriptions of aspects, features, and one or more embodiments of the present invention.

Accordingly, one aspect of the present invention relates to a beekeeping apparatus. The beekeeping apparatus includes a bottom side having an arcuate groove defined therein, the arcuate groove being sized and dimensioned to correspond to the rim of a repository; and a top side including a recessed area defined therein, the recessed area being sized and dimensioned to correspond to a beekeeping frame, and a plurality of generally rectangular openings defined through the recessed area, the rectangular openings each being sized and dimensioned to receive and retain a portion of a beekeeping frame, and collectively being sized and dimensioned to receive and retain portions of different sizes of beekeeping frames.

In a feature of this aspect, a cross-sectional shape of the recessed area is generally rectangular.

In a feature of this aspect, the recessed area includes protruding surfaces protruding proximate a midpoint of each lengthwise side of the recessed area, the protruding surfaces being sized and dimensioned to help stabilize a beekeeping frame received within the recessed area.

In a feature of this aspect, the arcuate groove is sized and dimensioned to correspond to the rim of a five gallon bucket.

In a feature of this aspect, the beekeeping apparatus comprises plastic.

In a feature of this aspect, the beekeeping apparatus comprises aluminum.

In a feature of this aspect, the beekeeping apparatus comprises molded plastic.

In a feature of this aspect, the beekeeping apparatus comprises cast metal.

Another aspect relates to a beekeeping apparatus which includes a bottom side having an arcuate groove defined therein. The arcuate groove is sized and dimensioned to correspond to the rim of a repository having a generally circular cross-sectional shape. The beekeeping apparatus further includes a top side including a recessed area defined therein. The recessed area is sized and dimensioned to correspond to a beekeeping frame. The top side further includes a first plurality of generally rectangular openings defined through the recessed area on a first lengthwise side of a midpoint of the recessed area, and a second plurality of generally rectangular openings defined through the recessed area on a second lengthwise side of the midpoint of the recessed area. The second lengthwise side is the opposite side as compared to the first lengthwise side. Each of the generally rectangular openings is sized and dimensioned to receive and retain a protruding portion of a beekeeping frame when a portion of the beekeeping frame is received within the recessed area. The generally rectangular openings are spaced to receive and retain portions of different sizes of beekeeping frames.

In a feature of this aspect, the beekeeping apparatus is configured to be mounted onto a repository having a generally circular cross-sectional shape by placing the beekeeping apparatus on top of the repository such that a rim of the repository is received within the arcuate groove.

In a feature of this aspect, the beekeeping apparatus is configured to receive and retain a first size beekeeping frame within the recessed area such that it extends vertically upward above a repository when the beekeeping apparatus is mounted onto the repository. In at least some implementations, the beekeeping apparatus is configured to receive and retain a second size beekeeping frame within the recessed area such that it extends vertically upward above a repository the beekeeping apparatus is mounted onto, the second size being different than the first size. In at least some implementations, the beekeeping apparatus is configured to receive and retain a third size beekeeping frame within the recessed area such that it extends vertically upward above a repository the beekeeping apparatus is mounted onto, the third size being different than the first or second size.

In a feature of this aspect, the first plurality of generally rectangular openings comprises three openings.

In a feature of this aspect, the second plurality of generally rectangular openings comprises three openings.

In a feature of this aspect, the first plurality of generally rectangular openings comprises two openings.

In a feature of this aspect, the second plurality of generally rectangular openings comprises two openings.

Another aspect relates to a system comprising a repository having a generally circular cross-sectional shape and a beekeeping apparatus. The beekeeping apparatus includes a bottom side having an arcuate groove defined therein, the arcuate groove being sized and dimensioned to correspond to the rim of the repository, as well as a top side including a recessed area defined therein, the recessed area being sized and dimensioned to correspond to a beekeeping frame, a plurality of generally rectangular openings defined through the recessed area, the rectangular openings each being sized and dimensioned to receive and retain a portion of a beekeeping frame, and collectively being sized and dimensioned to receive and retain portions of different sizes of beekeeping frames. The system further includes a generally rectangular first beekeeping frame, a first side of the first beekeeping frame being generally received within the recessed area of the top side of the beekeeping apparatus, and the first side of the first beekeeping frame including a protrusion, the protrusion being received within one of the plurality of generally rectangular openings defined through the recessed area of the top side of the beekeeping apparatus.

In a feature of this aspect, the repository comprises a bucket.

In a feature of this aspect, the repository comprises a five gallon bucket.

Another aspect relates to a method comprising mounting a beekeeping apparatus onto a repository having a generally circular cross-sectional shape by positioning the beekeeping apparatus on top of the repository such that a portion of the rim of the repository is received within an arcuate groove defined in a bottom side of the beekeeping apparatus; securely mounting a beekeeping frame containing honeycomb onto the beekeeping apparatus by positioning a side of the beekeeping frame within a recessed area of a top side of the beekeeping apparatus such that a protruding portion of the beekeeping frame is received within one of a plurality of openings in the recessed area of the top side of the beekeeping apparatus; and uncapping cells of the honeycomb contained within the beekeeping frame such that honey from the cells flows into the repository.

Another aspect relates to a method comprising mounting a beekeeping apparatus onto a repository having a generally circular cross-sectional shape by positioning the beekeeping apparatus on top of the repository such that a portion of the rim of the repository is received within an arcuate groove defined in a bottom side of the beekeeping apparatus; securely mounting a beekeeping frame containing honeycomb onto the beekeeping apparatus by positioning a first side of the beekeeping frame within a recessed area of a top side of the beekeeping apparatus such that a first protruding portion of the beekeeping frame is received within one of a plurality of openings in the recessed area of the top side of the beekeeping apparatus; uncapping cells of the honeycomb contained within the beekeeping frame that are disposed closest to the repository such that honey from the cells flows into the repository; removing the beekeeping frame from the beekeeping apparatus; rotating the beekeeping frame; securely mounting the beekeeping frame onto the beekeeping apparatus by positioning a second side of the beekeeping frame that is opposite the first side within the recessed area of the top side of the beekeeping apparatus such that a second protruding portion of the beekeeping frame is received within one of a plurality of openings in the recessed area of the top side of the beekeeping apparatus; and uncapping cells of the honeycomb contained within the beekeeping frame that are disposed closest to the repository such that honey from the cells flows into the repository.

In a feature of this aspect, the first said step of uncapping cells of the honeycomb contained within the beekeeping frame comprises starting proximate a midpoint of the frame.

In a feature of this aspect, the first said step of uncapping cells of the honeycomb contained within the beekeeping frame comprises starting proximate the first side of the frame.

Other aspects of the present invention relate to, inter alia, a system for beekeeping, a method for beekeeping, a method for obtaining honey, and a method of uncapping.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

One or more preferred embodiments of the present invention now will be described in detail with reference to the accompanying drawings, wherein the same elements are referred to with the same reference numerals, and wherein.

DETAILED DESCRIPTION

Figure 1:
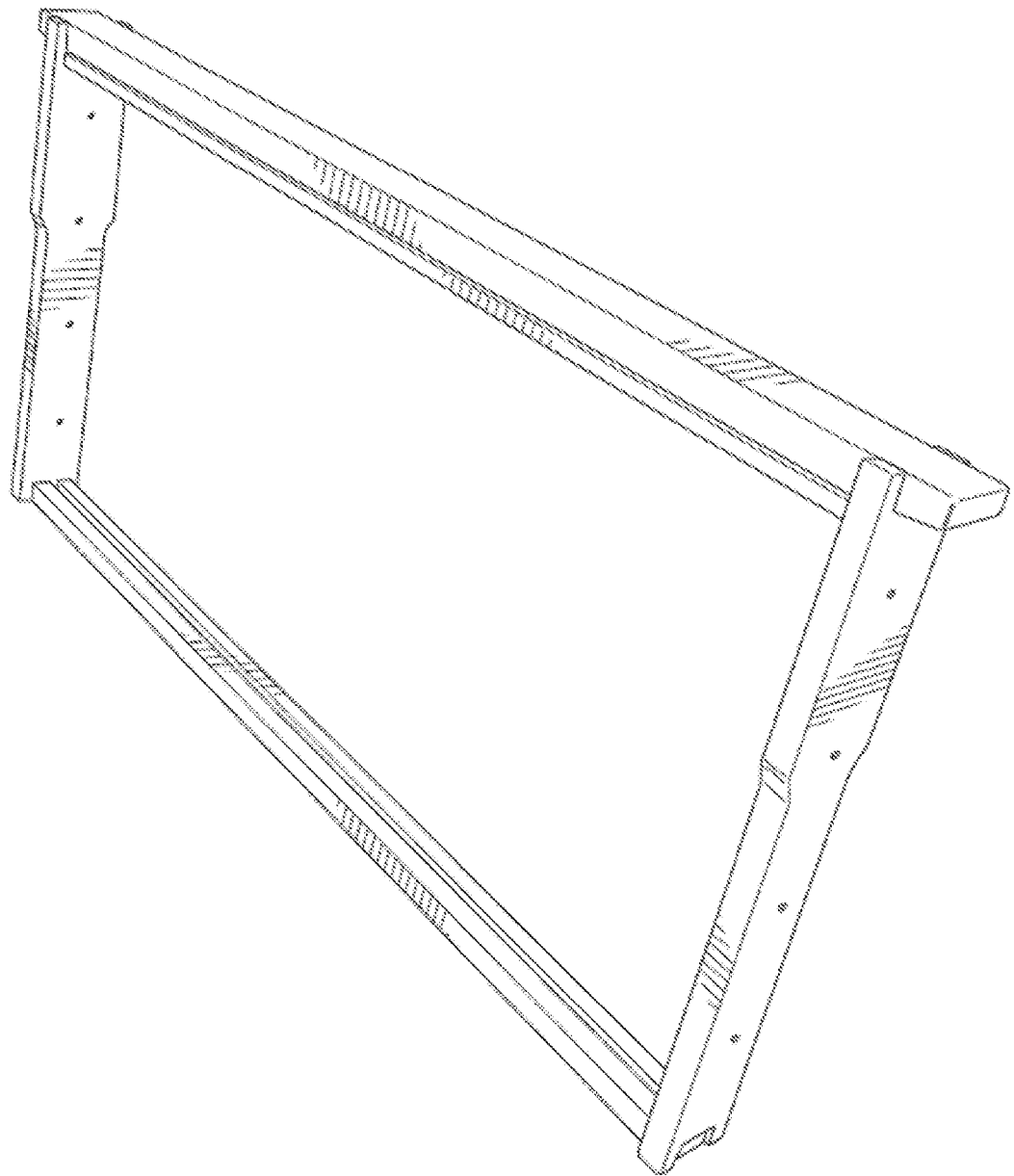
FIGS. 1-2 illustrate exemplary beekeeping frames.
Figure 2:
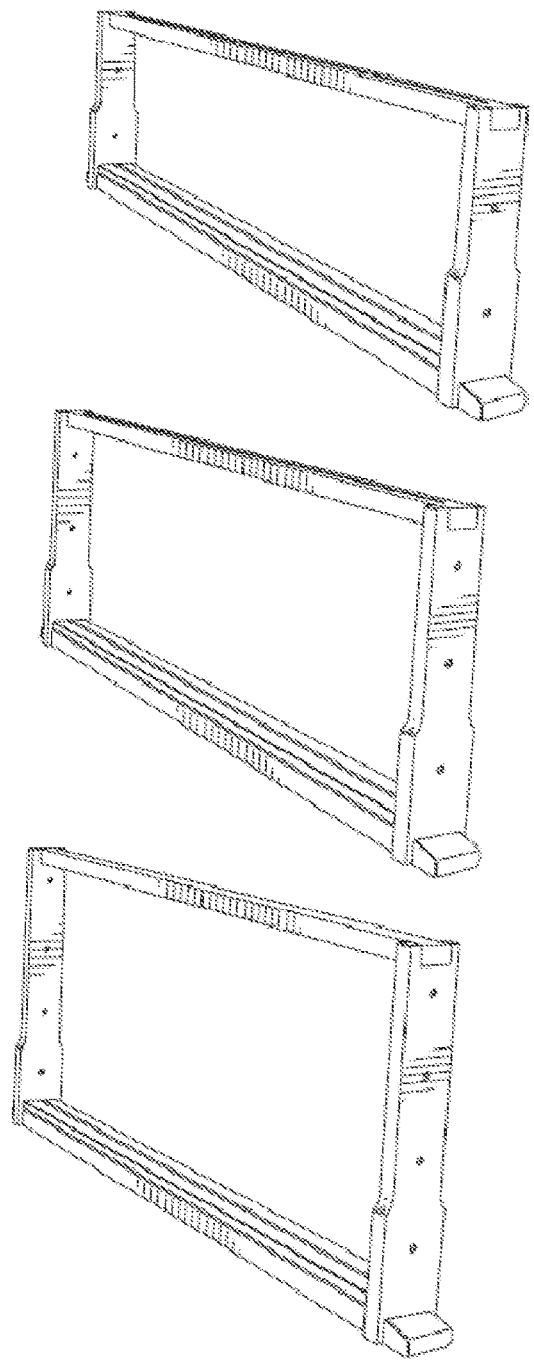

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. § 112, ¶6, no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Figure 4:
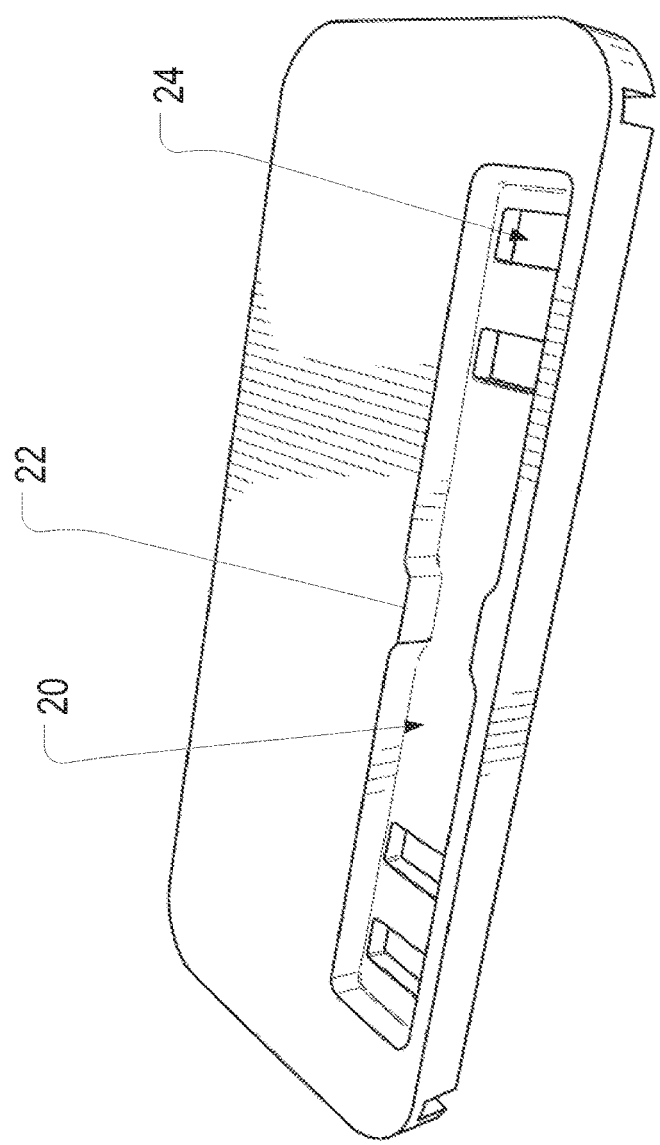
FIGS. 4-5 illustrate a preferred implementation of a beekeeping apparatus in accordance with an embodiment of the present invention.
Figure 5:
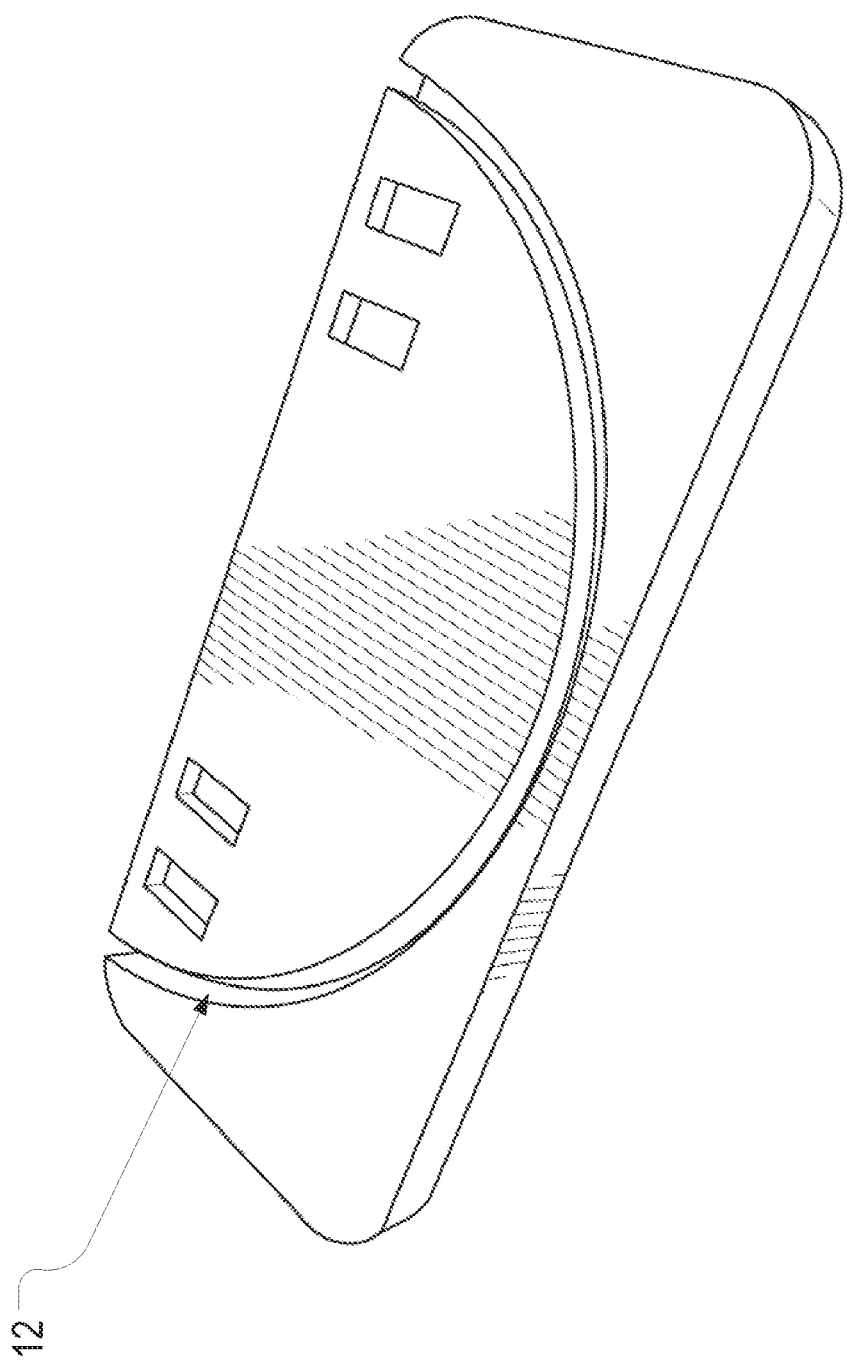

Turning now to the drawings, FIGS. 4-5 illustrates a preferred implementation of a beekeeping apparatus 10 in accordance with an embodiment of the present invention. FIG. 4 illustrates a top side of the beekeeping apparatus 10, while FIG. 5 illustrates a bottom side of the beekeeping apparatus 10.

As illustrated, the bottom side of the beekeeping apparatus 10 includes an arcuate groove 12. The arcuate groove 12 is preferably sized and dimensioned to correspond to the rim of a five gallon bucket, such as the five gallon bucket illustrated in FIG. 3. The arcuate groove 12 enables the beekeeping apparatus 10 to be secured to such a five gallon bucket by disposing the beekeeping apparatus 10 on top of the five gallon bucket such that a portion of the rim of the five gallon bucket is received within the arcuate groove 12. Gravity, and the depth of the groove 12, serves to secure the beekeeping apparatus 10 in place.

Figure 3:
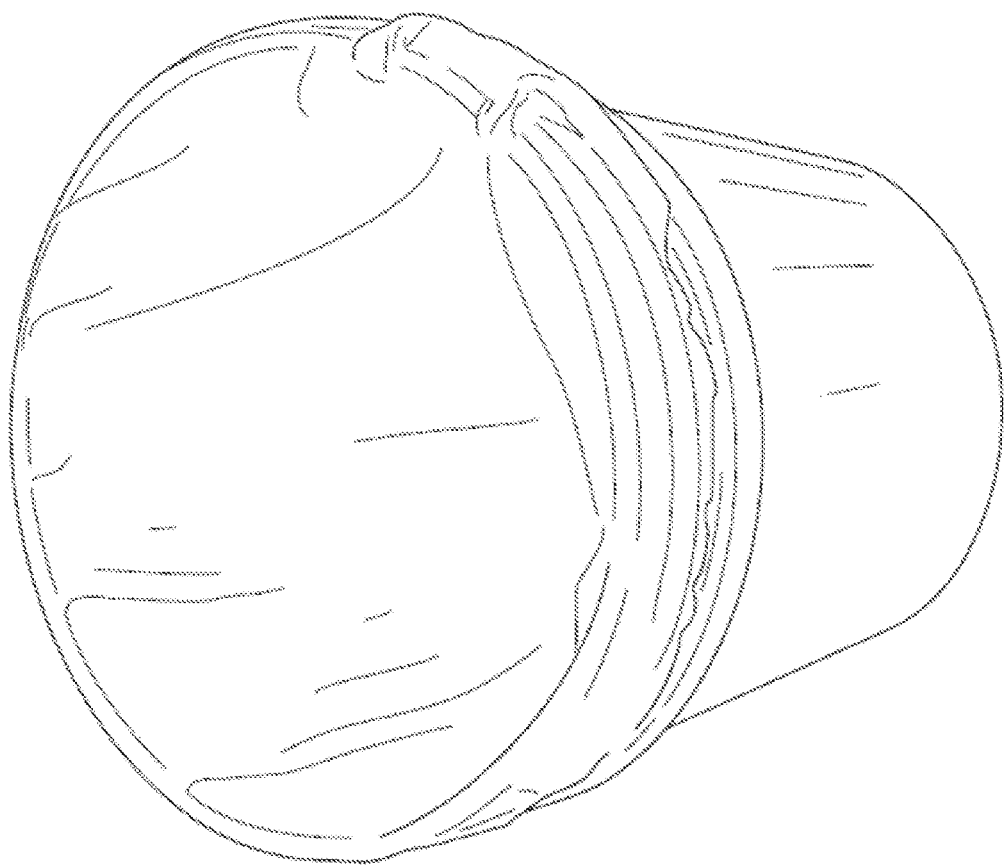
FIG. 3 illustrates a five gallon bucket which could be used to capture honey following uncapping of honeycomb built into a frame.
Figure 6:
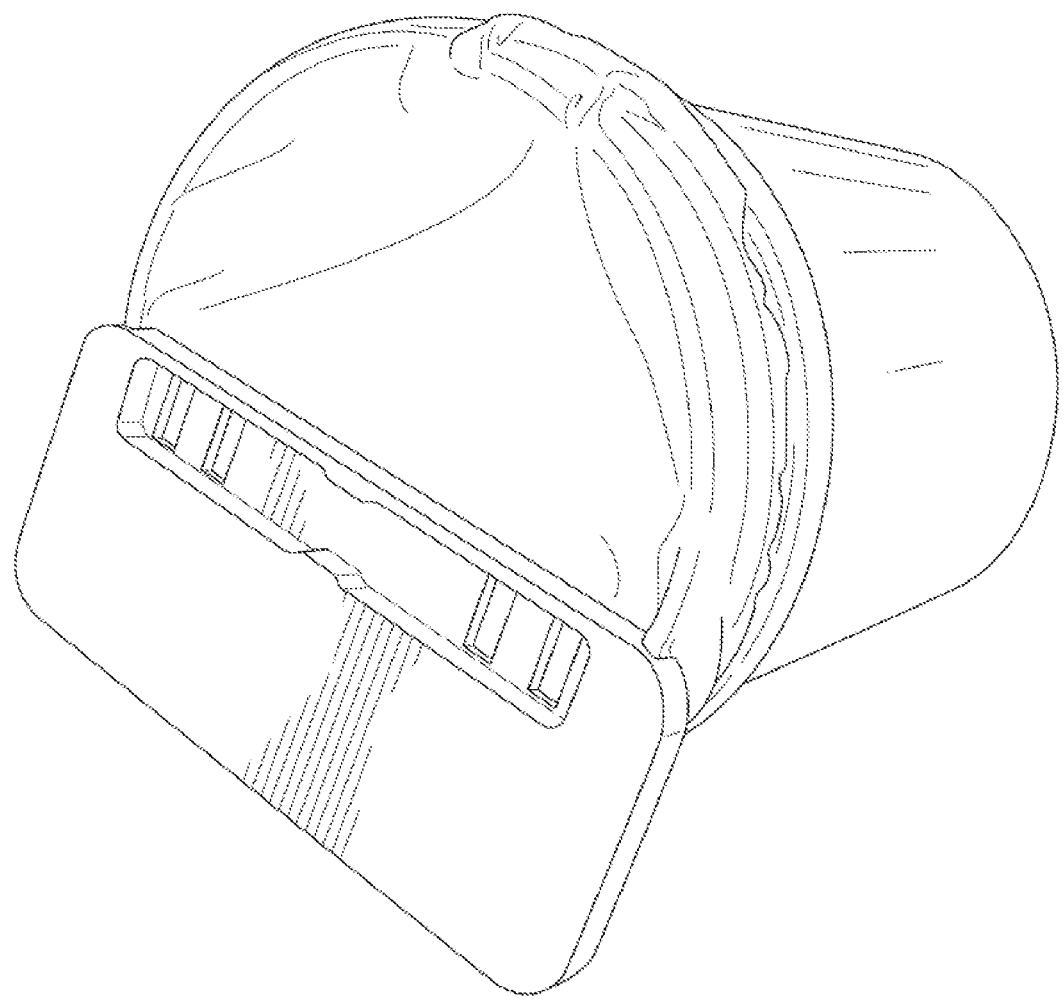
FIG. 6 illustrates the beekeeping apparatus of FIG. 4 secured to the five gallon bucket of FIG. 3.
Figure 10:
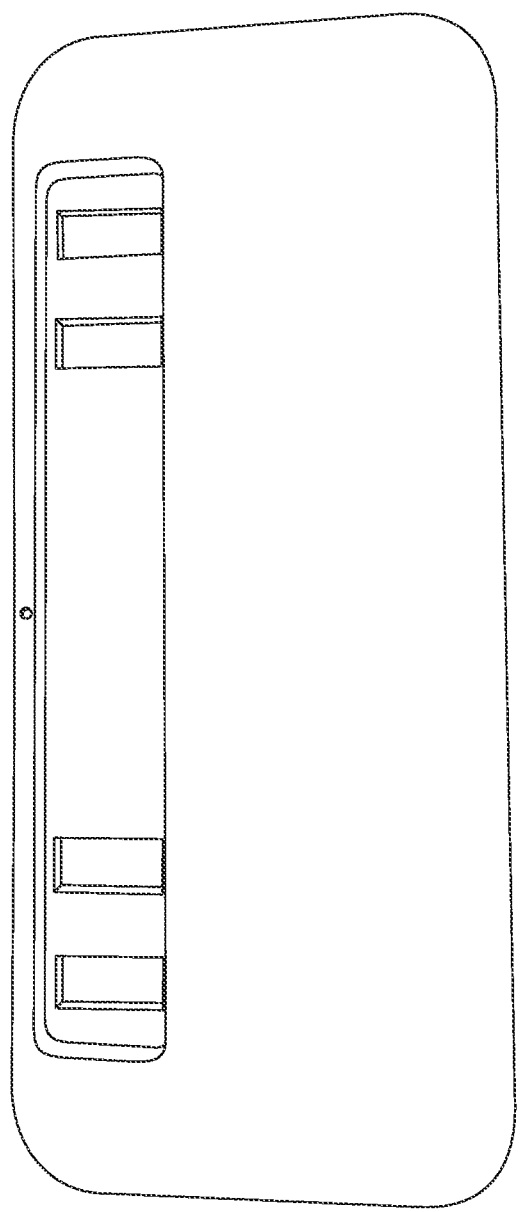
FIG. 10 illustrates a preferred implementation in which protruding surfaces are omitted from a recessed area.

FIG. 6 illustrates the beekeeping apparatus 10 secured to the five gallon bucket of FIG. 3. As illustrated in both FIG. 4 and FIG. 6, the top side of the beekeeping apparatus 10 includes a recessed area 20 defined in the surface of the top side. The cross-sectional shape of the recessed area is generally rectangular with rounded corners, but additionally includes protruding surfaces 22 protruding proximate a midpoint of each lengthwise side. The recessed area 20 itself is sized and dimensioned to accommodate a side of a beekeeping frame, and the protruding surfaces 22 are preferably sized and dimensioned to help stabilize a beekeeping frame received within the recessed area 20. Notably, in alternative implementations, protruding surfaces 22 may be omitted, may be positioned differently, or more or less protruding surfaces may be utilized. For example, FIG. 10 illustrates a preferred implementation in which protruding surfaces are omitted from a recessed area.

Figure 7:
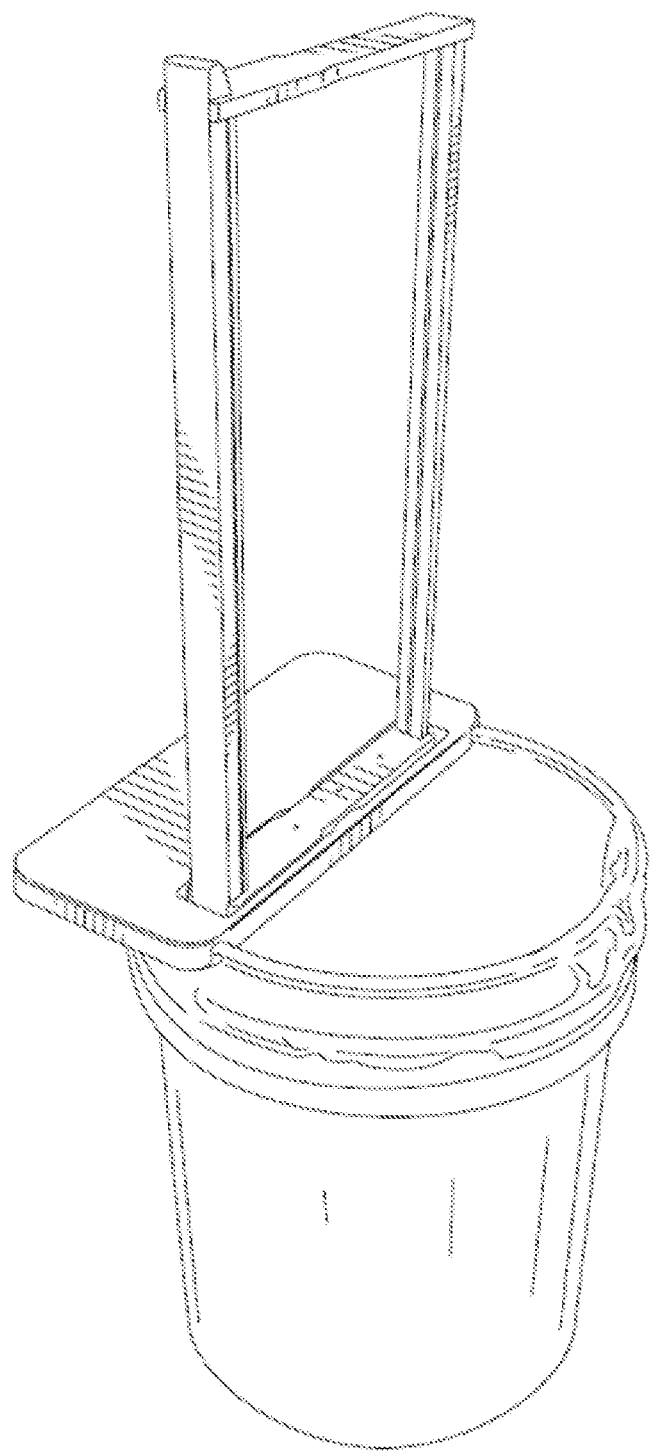
FIG. 7 illustrates receipt of a frame within a recessed area of the beekeeping apparatus of FIG. 4.

The recessed area 20 preferably includes a plurality of generally rectangular openings 24 defined therethrough. The generally rectangular openings 24 are preferably sized and dimensioned to correspond to overhanging portions of a beekeeping frame, such as those portions 02 illustrated in FIG. 1. The openings 24 are preferably configured to correspond to multiple sizes of frames, such that a frame having a first depth could be received within the recessed area 20 such that an overhanging portion is received within a first one of the openings 24, as illustrated in FIG. 7, while a frame having a second, lesser depth, could be received within the recessed area 20 such that an overhanging portion is received within a different one of the openings 24 disposed closer to a lengthwise middle of the recessed area 20.

In some preferred implementations, the beekeeping apparatus 10 is constructed of plastic, while in at least some other implementations the beekeeping apparatus is constructed of aluminum or another metal. The beekeeping apparatus 10 may be molded or cast, or constructed in any other suitable fashion.

In a preferred method of use, a user secures the beekeeping apparatus 10 to a bucket, removes a frame containing honeycomb from a hive, and then secures the frame to the beekeeping apparatus 10 by positioning a side of the frame within the recessed area 20 such that an overhanging portion of the frame is disposed in an opening 24 of the beekeeping apparatus 10. The user can then uncaps cells of the honeycomb, for example by using an uncapping tool such as an uncapping fork or knife.

In a preferred methodology, the user first uncaps a lower portion, such as a lower half, of the honeycomb, then flips the frame 180 degrees vertically so the previously upper comb will now be disposed proximate the new lowest portion of the frame, and uncaps the remaining portion of the honeycomb, such as the other half. Such a methodology is believed to allow for clean uncapping utilizing the beekeeping apparatus 10 and a five gallon bucket of a honeycomb secured to a frame that may otherwise be too large to cleanly uncap over a five gallon bucket (for example, uncapping the entire honeycomb at once may cause a portion to fall over the side of the bucket). In at least some preferred methodologies, when uncapping each portion, a user starts proximate a middle of the length of the frame, while in at least some other preferred methodologies, a user starts proximate a bottom of the length of the frame (relative to its then-current disposition).

Figure 8:
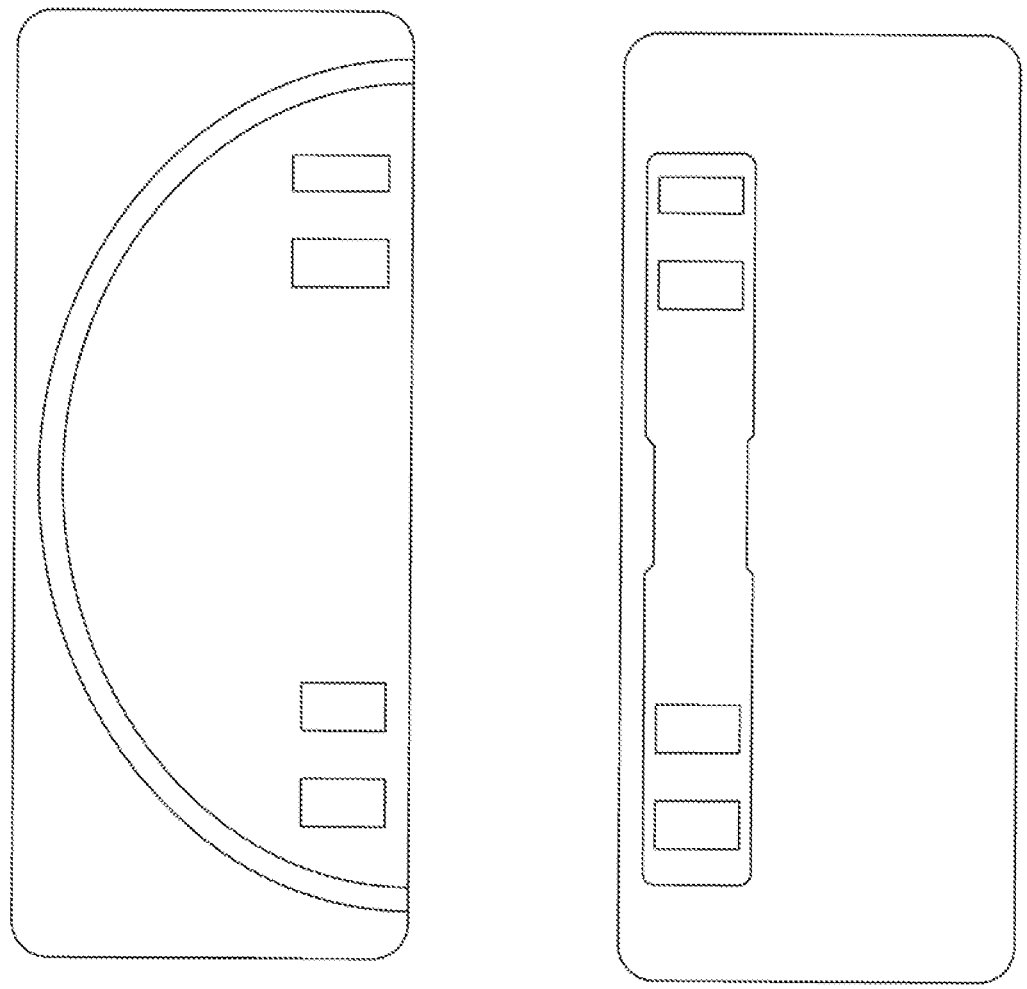
FIG. 8 illustrates schematics for a preferred implementation of a beekeeping apparatus.
Figure 9:
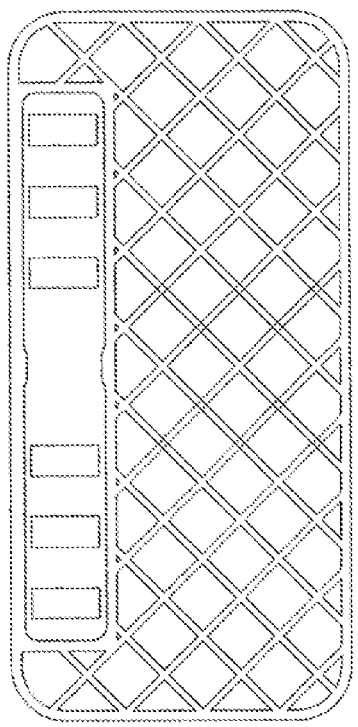
FIG. 9 illustrates a top side of a preferred implementation of a beekeeping apparatus in which sections have been cored out.

FIG. 8 illustrates schematics for a preferred implementation of a beekeeping apparatus. In the schematics, the beekeeping apparatus, like the beekeeping apparatus 10 illustrated in previous figures, is primarily solid. In at least some implementations, however, a beekeeping apparatus is designed to require less material by coring out sections of the beekeeping apparatus. The top side of such an exemplary beekeeping apparatus is illustrated in FIG. 9.

Figure 11:
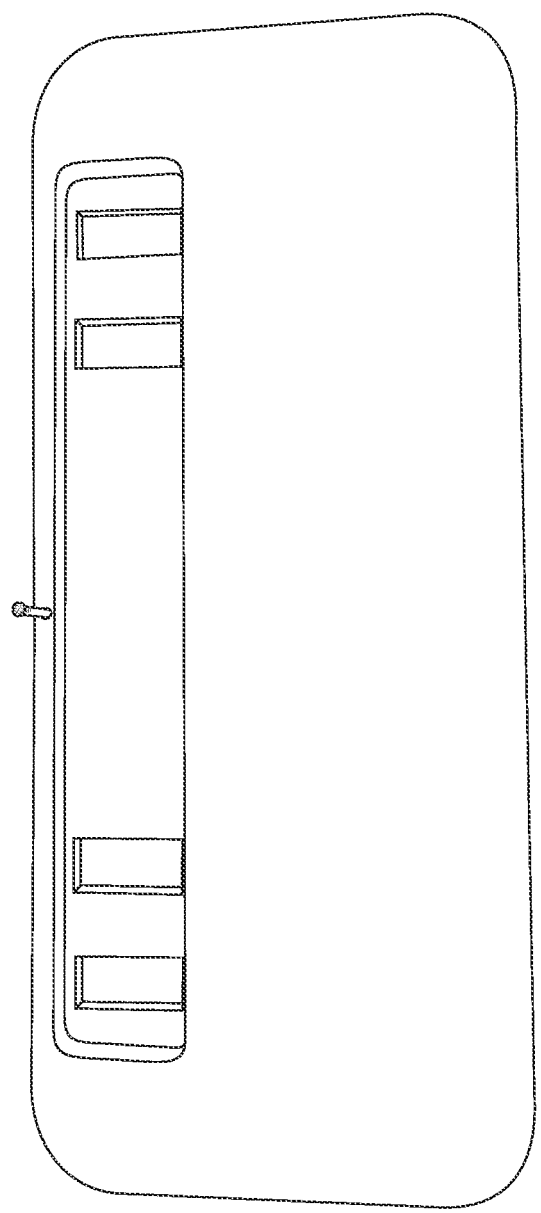
FIG. 11 illustrates insertion of a nail into an opening of a preferred implementation of a beekeeping apparatus.

In one or more preferred implementations, a beekeeping apparatus includes one or more openings configured to receive a nail or nail-shaped object. Such an opening may be defined in a top side of a beekeeping apparatus, a bottom side of a beekeeping apparatus, or be defined through the beekeeping apparatus all the way from the top side to the bottom side. FIG. 10 illustrates an exemplary beekeeping apparatus including such an opening, and FIG. 11 illustrates a nail received within the opening. In one or more methodologies of use, such a nail can be utilized to rest a beekeeping frame thereupon and spin the beekeeping frame.

Although the beekeeping apparatus thus far described herein are configured for use with a five gallon bucket, alternative implementations may be configured for use with other repositories, such as, for example, a larger or smaller bucket, or a different type of repository.

Additional disclosure of beekeeping apparatus in accordance with one more embodiments of the present invention is contained in an Appendix hereto in the form of photographs of such beekeeping apparatus. This Appendix is hereby incorporated herein by reference.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A beekeeping apparatus comprising:
  (a) a bottom side having an arcuate groove defined therein, each of two ends of the arcuate groove extending through a planar face of a first side of the beekeeping apparatus at a different point and the arcuate groove being sized and dimensioned to correspond to the rim of a bucket having a generally circular cross-sectional shape such that the beekeeping apparatus can be mounted onto the rim of the bucket with the rim of the bucket received within the arcuate groove; and
  (b) a top side including a plurality of receiving slots, each of the receiving slots being defined in a recessed area of the top side of the beekeeping apparatus;
  (c) wherein each of the receiving slots of the plurality of receiving slots is sized, dimensioned, and spaced to receive a protruding portion of a beekeeping frame.

2. The beekeeping apparatus of claim 1, wherein the beekeeping apparatus comprises plastic.

3. The beekeeping apparatus of claim 1, wherein the beekeeping apparatus comprises aluminum.

4. The beekeeping apparatus of claim 1, wherein the beekeeping apparatus comprises molded plastic.

5. The beekeeping apparatus of claim 1, wherein the beekeeping apparatus comprises cast metal.

6. A method comprising molding a plastic beekeeping apparatus including
  (a) a bottom side having an arcuate groove defined therein, each of two ends of the arcuate groove extending through a planar face of a first side of the beekeeping apparatus at a different point and the arcuate groove being sized and dimensioned to correspond to the rim of a bucket having a generally circular cross-sectional shape such that the beekeeping apparatus can be mounted onto the rim of the bucket with the rim of the bucket received within the arcuate groove; and
  (b) a top side including a plurality of receiving slots, each of the receiving slots being defined in a recessed area of the top side of the beekeeping apparatus;
  (c) wherein each of the receiving slots of the plurality of receiving slots is sized, dimensioned, and spaced to receive a protruding portion of a beekeeping frame.

* * * * *